United States Patent Office 3,502,576
Patented Mar. 24, 1970

3,502,576
PROCESS FOR DETOXIFICATION OF CYANIDE AND NITRITE CONTAINING AQUEOUS SOLUTIONS
Johannes Müller, Frankfurt am Main, and Rudolf Kuhn, Koppern, Taunus, Germany, assignors to Deutsche Gold- und Silber - Scheideanstalt vormals Roessler, Frankfurt am Main, Germany
No Drawing. Filed Oct. 14, 1968, Ser. No. 767,467
Claims priority, application Germany, Nov. 4, 1967, 1,621,568
Int. Cl. C02b 1/34
U.S. Cl. 210—63           8 Claims

ABSTRACT OF THE DISCLOSURE

Detoxification of cyanide and nitrite containing aqueous solutions is accomplished by mixing the cyanide and nitrite solutions and reacting the cyanide with the nitrite at a pH of not over 5 in the presence of a contact catalyst.

---

Cyanides, especially those which are not bound in complexes, and nitrites are exceptionally poisonous substances which are allowed to occur in waste waters and main drainage channels only in exceedingly small concentrations (cyanide 0.1 mg./liter, nitrite about 10 to 20 mg./liter). Since both substances are used, particularly in the hardening industry, for different processes, the removal of the waste in many cases creates a serious problem. Of course, completely automatic plants for detoxification are known today. They are, however, expensive and the use of chemicals for oxidation of nitrites and cyanides, for acidification and finally for neutralization is considerable. Especially as oxidizing agents, there is employed mainly chlorine gas, sodium hypochloride or, in certain cases, hydrogen peroxide which make for a considerable cost factor in the detoxification of cyanide and nitrite containing waste water.

The detoxification of cyanides is successful chiefly through oxidation with the above-named agents to cyanates or other methods whereby non-poisonous cyanates are obtained. The detoxification of nitrites can also be obtained by oxidation to nitrates. However, there is also considered a reduction to nitrogen, as is accomplished, for example, in using urea.

The present invention is directed to the idea of allowing cyanides and nitrites to react with each other with the result that the nitrites oxidize the cyanides to cyanates or other materials and at the same time they themselves are reduced to non-poisonous substances, especially nitrogen.

This reaction is not achieved, however, by bringing the reactants together in neutral and alkaline conditions, so that utilization of this possibility until now has not been put to practice.

It has now been surprisingly proven, that the reaction occurs with interesting great rapidity if the reacting solutions are acidified to a hydrogen ion concentration of about 5 or less and if at the same time a contact catalyst is introduced to hasten the reaction. The pH can be as low as 0. Of course, in most cases such a reaction must occur in a completely closed apparatus which, however, presents no problem. As corresponding experiments have shown, the cyanide is converted partially to cyanate and partially to carbonate while the nitrite is completely reduced so that finally only pure nitrogen remains.

As catalysts, one uses suitable highly activated carbon or highly activated silica. Other high surface area catalysts can be used, such as activated alumina. There can also be employed other catalysts, for example, metallic catalysts, in which case it is only necessary that the chosen metal does not go into solution (as does, for example, copper or nickel) and thereby create a new problem of detoxification.

Examples of suitable metals include activated metals from the Pt group such as Pt or Pd.

The preferred acid for reducing the pH is sulfuric acid but there can be employed other acids such as muriatic acid, hydronitric acid and others.

The original cyanides and nitrites which are used in the invention can be, for example, alkali compounds such as sodium cyanide, potassium cyanide, sodium nitrite and potassium nitrite.

The process of the invention has very great commercial significance. The equivalent amounts of nitrite and cyanide react with each other and thereby become non-poisonous. The detoxification is successful without the use of additional chemicals which is important in regard to the waste water and also without additional oversalinity of the water. It is also significant that the necessary equipment becomes simpler, since it is now no longer necessary to dosage the different chemicals and, as is often already done today, to add these dosages automatically.

Unless otherwise indicated, all parts are by weight.

The manner of carrying out the process of the invention is illustrated in the following examples. Completely closed equipment was used in the examples.

EXAMPLE 1

There were brought together in aqueous solution 806 mg./liter of NaCN and 4000 mg./liter of sodium nitrite, which were acidified to a pH of 4.5 with sulfuric acid and then pumped over an activated carbon catalyst at a reaction temperature of 70° C. for 3.5 hours.

A chemical analysis was then made which showed that there was practically no more cyanide in the solution while as the reaction product, there were obtained 275 mg./liter of sodium cyanate and 562 mg./liter of sodium carbonate. The detoxification was complete.

EXAMPLE 2

1612 mg. of sodium cyanide and 2000 mg. of sodium nitrite were dissolved in 1 liter of water, acidified to a pH of 3 with sulfuric acid and pumped for 3.5 hours at 70° C. over activated carbon catalyst.

Besides the reaction products of sodium cyanate and sodium carbonate, there was only found the residue of the cyanide since in this case, the cyanide was employed in excess. The nitrite had all been converted to nitrogen.

While the examples were carried out at 70° C., the temperature can be varied from atmospheric, e.g. room temperature, to the boiling point of the solution. Normally, atmospheric conditions will be employed. The use of elevated temperatures was employed in the examples simply to hasten the reaction.

What is claimed is:

1. A process for detoxification of cyanide and nitrite containing aqueous solutions comprising mixing the cyanide and nitrite solutions and reacting the cyanide with the nitrite at a pH of not over 5 in the presence of a contact catalyst.

2. A process according to claim 1, wherein the catalyst is selected from the group consisting of activated carbon, activated silica, activated alumina and metals which are insoluble in the acid mixture.

3. A process according to claim 1, wherein the reaction is carried out without access to the atmosphere.

4. A process according to claim 1, wherein the catalyst is activated carbon.

5. A process according to claim 4, wherein the cyanide and nitrite are alkali metal cyanides and nitrites.

6. A process according to claim 5, wherein the cyanide and nitrite are employed in substantially equivalent amounts.

7. A process according to claim 1, wherein the catalyst is activated silica.

8. A process according to claim 1, wherein the reaction is carried out at a temperature between room temperature and the boiling point of the solution.

References Cited

UNITED STATES PATENTS

| | | | |
|---|---|---|---|
| 2,459,464 | 1/1949 | Smith | 210—63 X |
| 3,275,547 | 9/1966 | Bucksteeg et al. | 210—39 X |

FOREIGN PATENTS

| | | |
|---|---|---|
| 139,159 | 5/1921 | Great Britain. |
| 235,219 | 8/1964 | Austria. |
| 1,036,707 | 4/1953 | France. |

OTHER REFERENCES

Vogel, A., et al., Cyanide Poisoning, Proc. 6th Ind. Waste Conf., Purdue Univ., 1951, pp. 329–336.

MICHAEL E. ROGERS, Primary Examiner

U.S. Cl. X.R.

23—63, 75, 220